United States Patent [19]
Cluzel et al.

[11] Patent Number: 5,929,433
[45] Date of Patent: Jul. 27, 1999

[54] READING DEVICE FOR A MOSAIC OF ELECTROMAGNETIC DETECTORS AND DETECTION SYSTEM EQUIPPED WITH SUCH A DEVICE

[75] Inventors: Jacques Cluzel; Pierre Nicolas, both of St. Egrève, France

[73] Assignee: Commissariat A. L'Energie ATomique, Paris, France

[21] Appl. No.: 08/880,287

[22] Filed: Jun. 24, 1997

[30] Foreign Application Priority Data

Jul. 12, 1996 [FR] France ................................ 96 08744

[51] Int. Cl.$^6$ .............................. G01J 1/00; H01J 40/14
[52] U.S. Cl. .................................. 250/208.1; 250/338.4; 348/164
[58] Field of Search ............................. 250/208.1, 208.2, 250/208.3, 214 R, 214.1, 338.1, 338.4, 339.02, 370.01, 370.08, 370.09, 370.14; 348/294, 302, 303, 308, 332, 164

[56] References Cited

U.S. PATENT DOCUMENTS

| 4,587,426 | 5/1986 | Munier et al. ........................ 250/338.4 |
| 4,609,824 | 9/1986 | Munier et al. ........................... 348/164 |
| 5,128,534 | 7/1992 | Wyles . | |
| 5,323,186 | 6/1994 | Chow . | |

FOREIGN PATENT DOCUMENTS

| 0 143 047 | 5/1985 | European Pat. Off. . |
| 0 148 654 | 7/1985 | European Pat. Off. . |
| 0 553 406 | 8/1993 | European Pat. Off. . |

OTHER PUBLICATIONS

Patent Abstracts of Japan, JP 02003973, NEC Corporation, vol. 014, No. 139 (E–0903), Mar. 15, 1990.

D.J. Bradley et al., *Sampling Effects in CdHgTe Focal Plane Arrays*, (1985), pp. 53–60, SPIE, vol. 590, Infrared Technology and Applications.

R.J. Dam et al., *Sampling Effects in CdHgTe Focal Plane arrays Practical Results* (1986), pp. 123–128, SPIE, vol. 685, Infrared Technology, XII (no month).

*Primary Examiner*—David Nelms
*Assistant Examiner*—John R. Lee
*Attorney, Agent, or Firm*—Burns, Doane, Swecker & Mathis LLP

[57] ABSTRACT

Reading device for an array of radiation detectors arranged as a mosaic of detectors and having a plurality of capacitors (222), each connected to a reading circuit (224, 225). According to the invention, each capacitor (222) is associated with a subarray of several detectors of the mosaic, the reading device also having a plurality of controllable switches (231, 232, 233, 224) for successively connecting each detector of each subarray respectively to the associated integrating capacitor (222) and the reading device having means (226) for controlling the closing and opening of the switches in an order excluding the simultaneous reading of the signal of closer neighbouring detectors.

10 Claims, 6 Drawing Sheets

READING DEVICE FOR A MOSAIC OF ELECTROMAGNETIC DETECTORS AND DETECTION SYSTEM EQUIPPED WITH SUCH A DEVICE

TECHNICAL FIELD

The present invention relates to a reading device for a mosaic of detectors and to a detection system equipped with such a device.

The invention more particularly applies to detection systems equipped with a plurality of detectors arranged as rows and columns in matrix form or more simply as monodimensional detector arrays.

The device according to the invention can be used not only for visible light detectors, but for any electromagnetic radiation detector type, including those sensitive to X-ray and infrared radiation.

Finally, the device according to the invention is suitable for both quantum and bolometric detectors.

PRIOR ART

An electromagnetic radiation detector supplies a signal in the form of a voltage or a current representative of the radiation which it receives. In order to condition the signal supplied by the detectors, a reading circuit, generally having a memory cell, is associated with each detector. This memory cell is used on the one hand for establishing a mean information and on the other for storing it until the actual reading thereof.

The mean or average information is generally obtained by an integration, either of the current of the detector, or of a current representative of the signal supplied by the detector, in a so-called integration capacity.

The reading circuit also ensures the multiplexing of informations from each memory cell to one or more output stages supplying a video signal which can be translated to form an image or for performing a space-time processing of informations supplied by the detectors.

For linear components, i.e. components in which the detectors are installed with a regular spacing in a single direction, the images are obtained by a scanning of the component or the observed scene. For components with a mosaic of detectors, the latter are generally installed in accordance with a matrix pattern. The scanning of the detectors is optional. This scan can be used for increasing the format of the image, for time delay integration (TDI) and for increasing the signal to noise ratio.

An important quality factor of a detection component is the ratio between the time taken for establishing the mean information of the signal supplied by an individual detector, generally called the integration time, and the time for outputting the informations from all the detectors, generally called the reading time. A ratio close to 1 means that the potential information of the component is used to its maximum.

In general terms, the reading devices associated with a detector array comprise a plurality of memories, i.e. a plurality of integration capacities. Thus, the greater the number of detectors, the more difficult it is to obtain a ratio between the integration time and the reading time which is close to 1. The increase in the size of the components (detection systems) is generally linked with a reduction in the spacing of the detectors forming the same (dimension of the elementary pattern) and therefore to a reduction of the integration capacitor. This leads to limitations as regards the integration time and to a reduced integration time to reading time ratio. When there is a large number of detectors, the information reading time becomes such that the charges supplied by each detector during this time are too great to be stored in an elementary memory associated with each detector.

Figure 1:
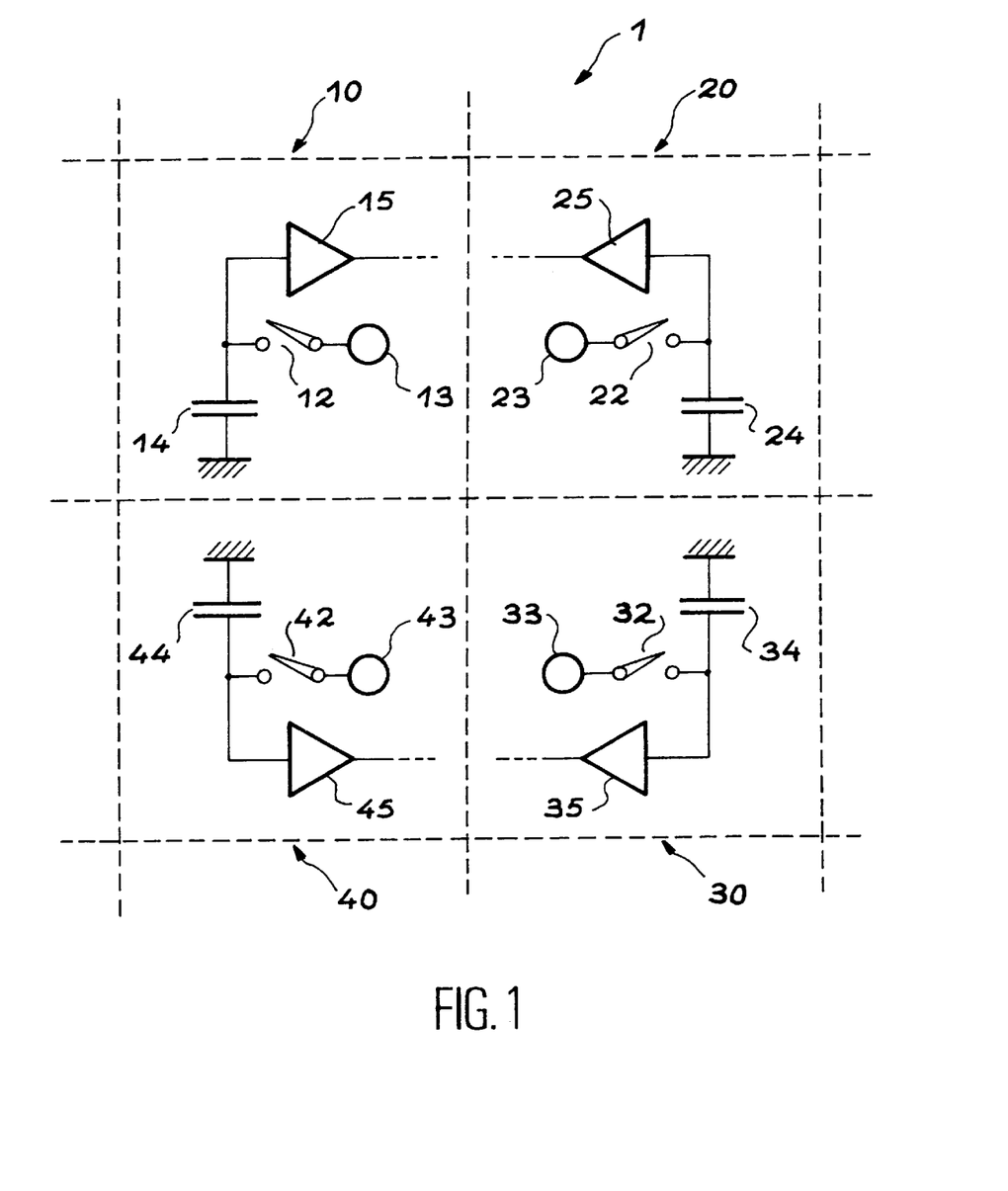
FIG. 1, already described, is a partial diagrammatic view of a known reading device.

FIG. 1 diagrammatically illustrates a known, multiple memory, reading device, in which an integration capacity forming a memory is associated with each detector. Such a reading device is in particular appropriate for a detector formed by a mosaic of individual, juxtaposed detectors.

In FIG. 1, the partly represented reading device is designated by the general reference 1. It has a plurality of reading circuit cells 10, 20, 30, 40, each comprising a reading circuit connected by means of a switch 12, 22, 32, 42 to a connection element 13, 23, 33, 43.

The connection elements 13, 23, 33, 43 are respectively electrically connected to detectors of a not shown detection circuit associated with the reading device.

Each reading circuit has an integrating capacitor, respectively 14, 24, 34, 44, and a follower amplifier respectively 15, 25, 35, 45. The follower amplifier of each reading circuit is connected to a not shown output circuit.

The wiring diagram of the reading circuit of FIG. 1 only constitutes a particular case among a plurality of other possibilities. FIGS. 2 to 6 give in exemplified manner other known possibilities for reading circuits. To simplify the description thereof, identical or similar elements in the different drawings are given the same references.

In FIGS. 2 to 6, the photoconductor and photovoltaic detectors are of the p-n type. They are symbolically represented by a detection diode and designated by the reference 110. The anode of the detection diode 110 is connected to a fixed voltage source $V_{det}$, whose cathode is connected to a reading circuit.

Figure 2:
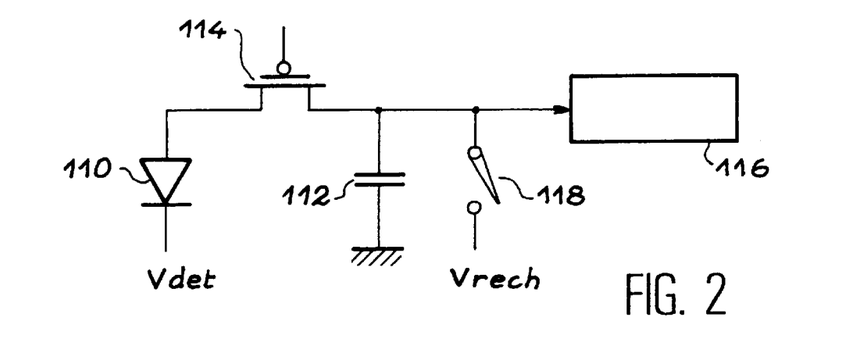
FIGS. 2 and 3, already described, are wiring diagrams for implementing known, direct injection reading circuits for the device of FIG. 1.

In FIG. 2, the detection diode 110 is connected to an integrating capacitor forming a memory by a MOS transistor 114 used under switching conditions as a switch. The transistor 114 also biases the detection diode 110 and matches the impedance between the detector and the reading circuit. A bias voltage $V_{pol}$ is applied to the gate of the transistor 110.

The integrating capacitor 112, whose function is to form a mean value of the signal received and to store the information relative to said signal is itself connected to a multiplexer or an amplifier, diagrammatically represented by the reference 116.

A switch 118 permits the connection of the integrating capacitor 112 to a recharging potential $V_{rech}$ and permits the initializing of the charge of the capacitor following each reading. This corresponds to the erasing of the memory constituted by the capacitor 112.

Figure 3:
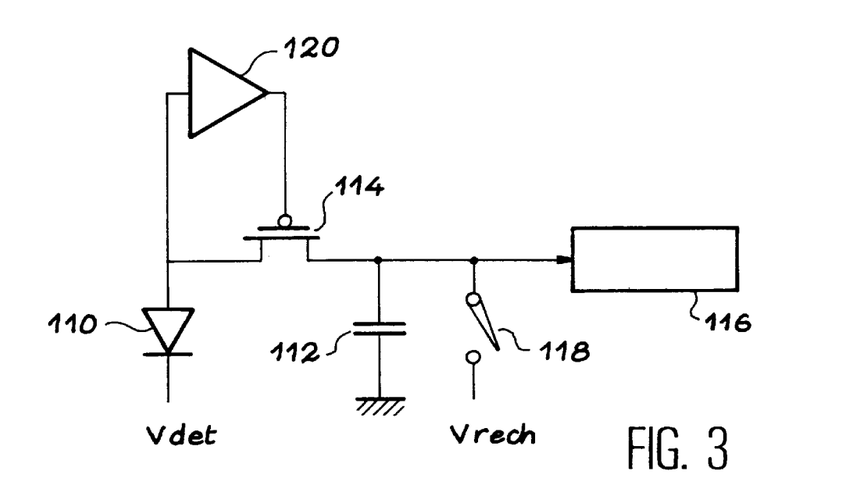

The circuit of FIG. 2 can be improved by adding a feedback amplifier 120 connecting the cathode of the detection diode 110 to the gate of transistor 114. This variant is illustrated in FIG. 3. The feedback back amplifier 120 ensures a better impedance matching and a better injection efficiency, i.e. a higher integrated current compared with the detected current variation of the diode 110 (when diode 110 undergoes an increase in its detection current).

Figure 4:
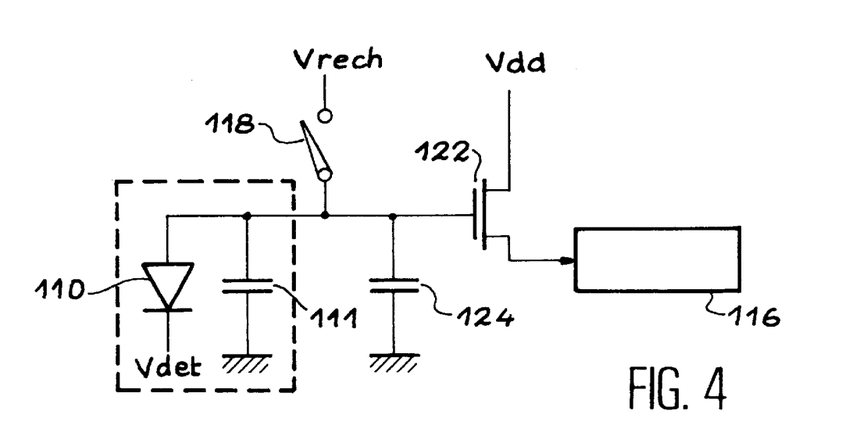
FIGS. 4 and 5, already described, are wiring diagrams for implementing known, voltage follower reading circuits for the device of FIG. 1.

The diagram of FIG. 4 essentially differs from that of FIGS. 2 and 3 by the fact that the detector is equipped with its own capacitor 111. The detection diode 110 integrates on its own capacitor and the signal is read by a voltage follower device. This device is constructed around a transistor 122, whose source is connected to a fixed voltage $V_{dd}$, whose drain is connected to the multiplexer 116 and whose gate is connected to the cathode of the detection diode 110. A gate capacitor 124 is connected in parallel with the capacitor 111. The recharging switch 118 permits the zeroing of the integration.

Figure 5:
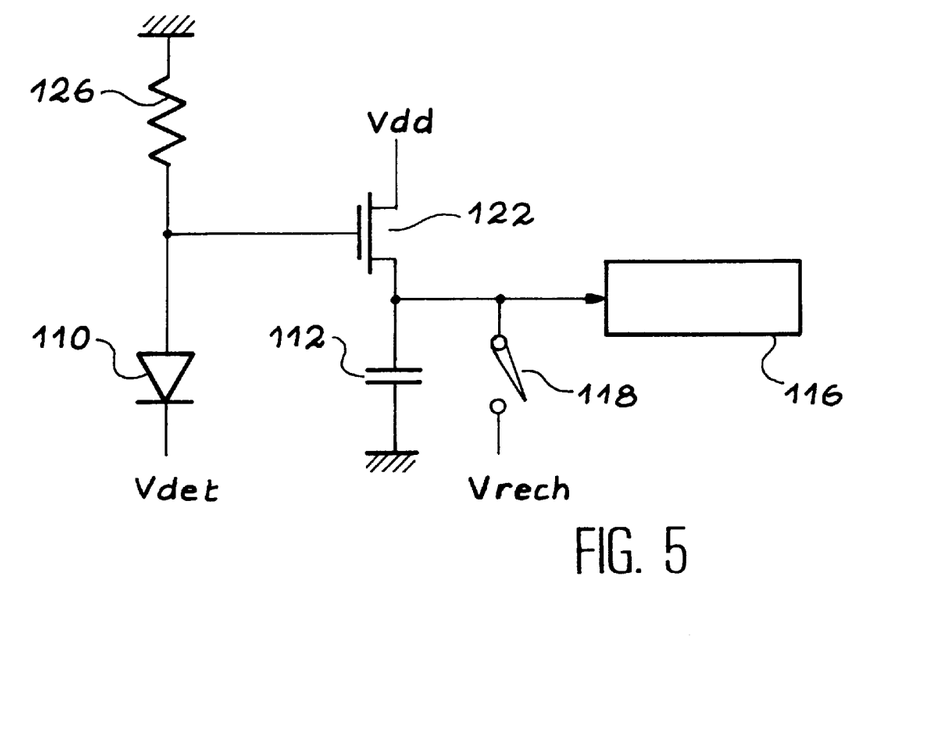

The reading circuit of FIG. 5 is a gate modulation reading circuit. It represents an improvement compared with the reading circuit of FIG. 4.

The cathode of the detection diode 110 is connected to earth by means of a load resistor 126 and is connected to the gate of a transistor 122. Thus, the voltage at the terminals of the detector controls the current supplied by the transistor 122 for charging an integrating capacitor 112. The initializing switch 118 and multiplexer are connected to the integrating capacitor 112, as in FIGS. 2 and 3.

Figure 6:
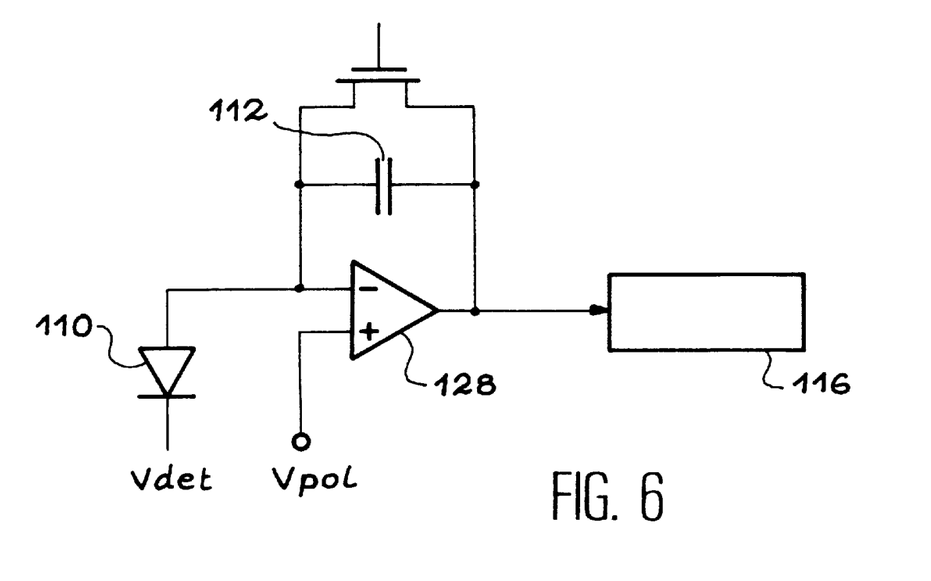
FIG. 6, already described, is a wiring diagram for implementing a known, operational amplifier reading circuit for the device of FIG. 1.

Another possibility for implementing the detection circuit is shown in FIG. 6. According to the diagram of FIG. 6, the detection diode 110 is connected to the multiplexer 116 by means of an operational amplifier 128.

The cathode of the detection diode is connected to the inverting input of the amplifier and a bias voltage $V_{pol}$ is applied to the non-inverting input. An integrating capacitor 112 is connected between the inverting input and the output of the operational amplifier. A transistor forming a switch connects the terminals of the capacitor 112.

Whichever reading circuit construction is used according to FIGS. 2 to 6, the reading device illustrated in FIG. 1 has a capacitor associated with each detector. In such a reading device, the integration is of the snap shot type. All the switches 12, 22, 32, 42 of the reading device are simultaneously closed and the information signal supplied by each detector is simultaneously collected respectively in each of the capacitors 14, 24, 34, 44. The charges are accumulated for a so-called integration time and then the switches are opened. The charge accumulated in each capacitor represents a mean signal of the corresponding detector and can then be read during a reading time.

In such a reading device it is possible to obtain a ratio between the integration time and the reading time which is close to 1. However, the component of FIG. 1 has a certain number of disadvantages linked with the implementation of the reading device and the way in which the information is processed.

For components equipped with a mosaic of detectors with a very large number of detectors arranged in accordance with a matrix diagram, the spacing between the individual detectors is necessarily small. The spacing is understood to mean the distance separating the centres of two consecutive detectors.

However, as each detector is individually associated with a cell of the reading circuit 10, 20, 30, 40, the spacing of the cells must be substantially the same as that of the detectors.

For components having a large number of detectors of the aforementioned type, the reduction of the spacing also leads to a reduction in the surface available for the integrating capacitor. Therefore the accumulation capacity of the charges and the possibility of having an information averaged over a long time are reduced. This limitation leads to a reduction in the sensitivity of the components, which is one of their vital characteristics.

For components whose detectors are arranged in a matrix plane, a partial solution to this problem consists of displacing the storage capacitors to the ends of the detection circuit rows or columns.

The detector spacing constraint is then limited to a single direction. However, in such an arrangement, each integrating capacitor stores the informations of all the detectors of a row or column at different times.

This corresponds to an electronic scanning of the integration making it possible to increase the integrated charge for each image, but the temporal coherence of the informations is then lost. The displacement of the storage sites to the end of the row or column for a matrix component is only of interest when the integration time, without any storage site displacement or offset is a few reading times of a row or column. This storage site displacement possibility is limited to particular applications in which the detectors have a short integration time. This is e.g. the case when the detectors supply a relatively high current compared with the storage capacity associated therewith.

A second problem caused by the reading devices relates to the so-called "diaphoty" phenomenon.

Diaphoty is an optical phenomenon comparable to cross talk. This phenomenon is in particular manifested by a mixture of informations between the closest neighbouring detectors. In other words, a signal produced by a photon reaching a sensitive area close to the periphery of an individual detector can be measured by the closest detector.

To avoid the phenomenon, it is necessary to physically space the detectors and thus reduce the filling level of the mosaic of detectors. This amounts to reducing the sensitive surface proportion compared with the non-sensitive surface.

However, a smaller filling level leads to a reduction in the probability of detecting a radiation and creates space undersampling problems. Space undersampling is understood to mean the non-respect of the Nyquist condition, namely a signal spatially modulated at a higher frequency than the spacing of the detectors is aliased and is therefore observed at a lower frequency. In practical terms, undersampling leads to a detection spectrum aliasing and the visual interpretation of the high space frequency details of the image becomes false.

These problems are described in greater detail in documents (1) and (2), whose references are given at the end of the present description.

In order to compensate the limitations due to undersampling, it is possible to carry out a microscan of the image formed on the detector mosaic. This solution is suggested by document (2). However, the practical performance of the microscan is complex and costly.

Finally, in most known detection components having a large number of detectors, it is necessary to find an acceptable compromise between the constraints linked with the filling level of the detector mosaic and those linked with the diaphoty phenomenon.

In order to obviate these difficulties and limitations, the object of the present invention is to propose a reading device allowing a maximum filling level of the detector mosaic, i.e. a reading device compatible with a detection component for which in practice the entire surface of the spacing or a surface greater than the spacing is a sensitive surface.

Another object of the invention is to propose a reading device which not only permits the avoidance of the undersampling problems, but which allows an oversampling.

Yet another object of the invention is to propose a reading device avoiding the diaphoty phenomenon.

The invention also aims at proposing a reading device for which the ratio between the integration time of the signal of the detectors and the reading time is improved compared with the prior art devices.

Another aim is to propose a device making it possible to obtain a mean information relative to a long time, i.e. with good signal storage possibilities.

Finally, another object of the invention is to supply a detection system equipped with the proposed reading device.

DESCRIPTION OF THE INVENTION

In order to achieve the aforementioned objects, the invention more specifically relates to a reading device for an array of radiation detectors arranged as a mosaic of detectors and having a plurality of so-called integrating capacitors, each connected to a reading circuit able to read during a reading time a charge, accumulated in the integrating capacitor during the integration time. According to the invention, each integrating capacitor is respectively associated with a subarray of several detectors of the mosaic, the reading device also having a plurality of controllable switches for successively connecting each detector of each detector subarray respectively to the integrating capacitor associated with said detector subarray, in order to collect a detection signal of said detector, and the reading device has means for controlling the closing or opening of the switches associated with each detector subarray in accordance with a sequential order excluding the simultaneous integration and simultaneous reading of the detection signal of the closest neighbouring detectors of the detector array.

In the sense of the present invention, it is considered that two detectors are the closest neighbouring detectors when they respectively have a common edge, an adjacent edge or a common angle apex.

As the sequential closure of the switches is provided for excluding the integration and reading in a simultaneous manner of the detection signal of neighbouring detectors, the diaphoty problems are avoided. Thus, when a detector is connected to the reading circuit and to the integrating capacitor associated therewith, the detection area to which corresponds the detected signal is perfectly defined. For example, when the detector is a diode, said area corresponds to a space charge area and a diffusion area of the detector in question. In the case where the detector is a diode, the diffusion area is defined as an area surrounding the p-n junction formed in the detector and in which the detection probability of an incident radiation exceeds a predetermined value generally fixed at 1/e ($\approx 0.37$). As the neighbouring detectors are then disconnected and consequently unbiased, there is no overlap of the detection areas.

It is also pointless to provide a physical spacing between neighbouring detectors of the detector mosaic. The physical spacing between neighbouring detectors is only limited by the electrical insulation to be ensured between the detectors.

As will become apparent hereinafter, it is possible to carry out an oversampling by implementing detectors, whereof the surface of the diffusion area and consequently the detection surface is larger than the spacing of the detectors on the mosaic. Oversampling is understood to mean an information read on a given detector is also read, at least partly, on a neighbouring detector.

Making an integrating capacitor common to several detectors makes it possible to dedicate a larger circuit surface to the integration function, i.e. to the integrating capacitor. The capacitance of the common integrating capacitor is consequently greater than that which a capacitor associated individually with each detector would have. The sensitivity of a detection component is directly linked with the integration time and consequently the storable charge quantity, so that the device according to the invention leads to a significant increase in the primary performance characteristics of the component.

With respect to the reading circuit, this rendering common of the integration site can be used for dedicating part of the available surface to the installation of processing functions, which was not possible in the prior art. These are functions such as skimming, antiblooming or impedance matching functions.

According to a particular aspect of the invention, the reading circuit can read the circuit during a so-called reading time and the switches are closed for collecting the detection signal during a so-called integration time, so that the number of detectors of each detector subarray can be chosen preferably in such a way that the sum of the reading times of the detectors of each subarray is increased (e.g. by the order of magnitude of the integration time).

In this case, the signal to noise ratio is also increased. This ratio increases substantially as the square root of the number of detectors of each subarray.

It is desirable for the integration time to be as close as possible to the image time, so as to improve the ratio of the integration time to the image time. The image time corresponds to the total time taken by reading and integration. When these two operations are time-successive, the image time is the sum of the reading time and the integration time.

In a particular embodiment of the reading circuit, it is possible to add thereto a so-called frame or speech memory in order to separate the reading and integration operations and so as to permit a simultaneous performance of these operations. In this case, with each integrating capacitor is associated another capacitor for reading. It is thus possible to obtain a reading time of the same order of magnitude as the integration time.

Advantageously, the number of detectors of each detector subarray, i.e. the number of detectors associated with the same integrating capacitor, can be the same for all the detector subarrays. This detector number is e.g. between 3 and 9 and is preferably 4. It is chosen as a function of the image time, the integration time and design rules.

According to another aspect of the invention, the detectors of each detector subarray can be grouped on the detector mosaic. It is considered that the detectors are grouped when the juxtaposing of their sensitive surfaces forms a compact surface, whose dimensions are reduced to a maximum. Such a surface is e.g. triangular, square or hexagonal.

Although this feature is not indispensable, it facilitates the connection and control of the reading circuits compared with an arrangement in which the detectors of a detector subarray were separated and dispersed on the detector mosaic.

According to a special embodiment of the device according to the invention, in which each detector subarray has four detectors, the means for controlling the switches are able to control the switches of each detector subarray in an identical order alternating the closure of switches of even order and switches of uneven order and each detector of the detector mosaic connected to a switch of even, respectively uneven order, is surrounded by closest neighbouring detectors connected to a switch of uneven, respectively even order.

According to another aspect of the invention, the reading circuits of the reading device respectively connected to an integrating capacitor can have biasing means for successively biasing each detector of a detector subarray, connected to the integrating capacitor by closing the corresponding controllable switch.

This feature is very advantageous. It not only avoids the simultaneous collection of the detection signal of closest neighbouring detectors, but also excludes the simultaneous biasing of closest neighbouring detectors. This measure contributes to the elimination of the aforementioned diaphoty phenomenon and facilitates the increase in the size of the sensitive surface of the detector connected to the integrating capacitor.

To this end, according to another aspect of the invention, when the detectors are quantum detectors, the polarizing means can apply to the detectors an adjustable bias voltage in order to vary the size and surface of the detection area. The quantum detectors are e.g. detectors such as diodes or photoconductors, in which an electron is associated with each detected photon.

In the case of e.g. p-n detectors, a greater reverse biasing leads to an increase in a space charge area at the p-n junction and increases the detector detection surface.

The present invention also relates to a detection system incorporating a detector mosaic and a reading device, as described hereinbefore.

The detector mosaic and reading device can be designed as a monolithic array. However, according to a variant, separate supports can be provided for the detectors and the reading device. These supports are then hybridized, e.g. by weld beads, in order to form the detection system.

Other features and advantages of the invention can be gathered from the following non-limitative description of preferred embodiments with reference to the attached drawings.

DETAILED DESCRIPTION OF EMBODIMENTS

Figure 7:
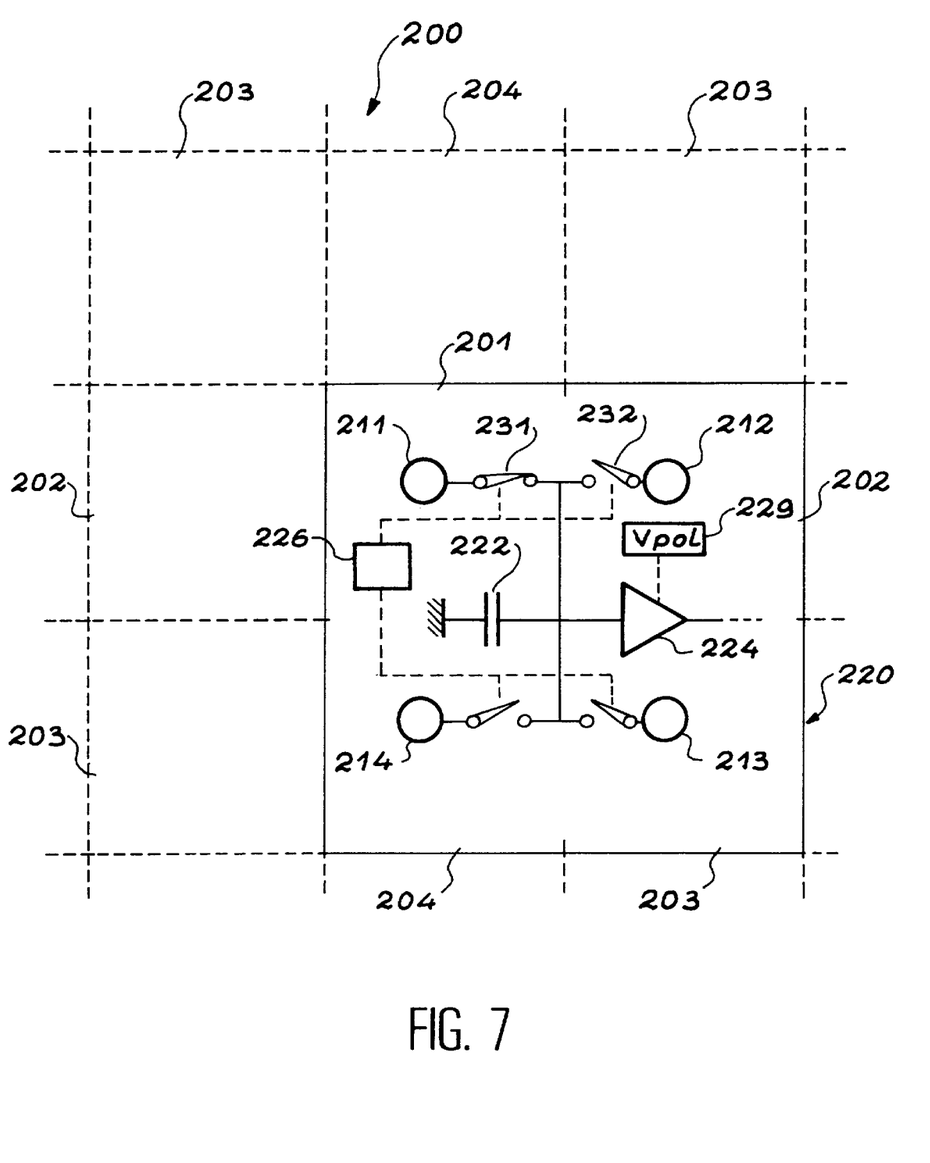
FIG. 7 is a part, diagrammatic, plan view of a reading device according to the invention.

FIG. 7 very diagrammatically and partially shows a substrate 200 of a reading device in which a group of regions 201, 202, 203, 204 are arranged with a spacing corresponding to that of the detectors of a detector mosaic. The spacing is considered to be the distance separating in a given direction the centre of one region from the centre of the closest neighbouring region. Each region is respectively associated with an individual detector of the detector mosaic. Part of the reading circuit of each region is respectively connected to the corresponding detector by means of a connection element. The references 211, 212, 213, 214 respectively designate the connection elements of regions 201, 202, 203, 204.

In the example of FIG. 7, regions 201, 202, 203, 204 are juxtaposed and square. They are associated with square detectors arranged in a similar manner. Regions 201, 202, 203, 204 are respectively grouped into subgroups of regions of an identical nature. Reference 220 designates one of the subgroups of regions of the substrate.

Each subgroup of regions has an integrating capacitor 222. A first terminal of the capacitor 222 is connected to earth. A second terminal of the capacitor is connected on the one hand to each of the connection elements 211, 212, 213, 214, respectively by controllable switches 231, 232, 233, 234 and on the other hand to a not shown, multiplexing circuit by means of an amplifier 224 or a switch, if the amplifier is offset. The switches are e.g. field effect transistors operating under switching conditions. The integrating capacitor 222 is consequently common to four detectors of the detector mosaic.

Control means 226 are provided for successively closing in a sequential order the switches 231, 232, 233, 234 in such a way that at a given instant at the most one switch of the subgroup of regions is not closed. The control means 226 can be equipped with a programmed computing unit or have a shift register-type circuit. The means 226 can be integrated into the regions of the substrate having the reading circuits or can be offset. Thus, elements 211, 212, 213, 214 and the corresponding detectors are successively connected to the integrating capacitor.

The reading circuit of the subgroup of regions 220 also has biasing means 229 for respectively biasing the detector connected to the circuit when the corresponding switch is closed. The biasing means able to apply an adjustable bias voltage $V_{pol}$ are designated by the reference 229. In the same way as the control means 226, the biasing means 229 can be integrated on the site of the reading circuits or can be offset.

The reading circuit of a subgroup of regions, as shown in FIG. 7, can be replaced by a circuit operating according to the principle of one of the reading circuits of FIGS. 2 to 5, with the exception of the fact that the detectors are not permanently connected to said circuit, but successively by switches 231, 232, 233, 234.

It is pointed out that the substrate has a plurality of subgroups of regions with a common reading circuit similar to the subgroup 220.

In the example of FIG. 7, each subgroup of regions has four regions 201, 202, 203, 204. Each subgroup of regions has an integrating capacitor and controllable switches connected to the control means 226, which can be common to all the switches of the reading device.

Figure 8:
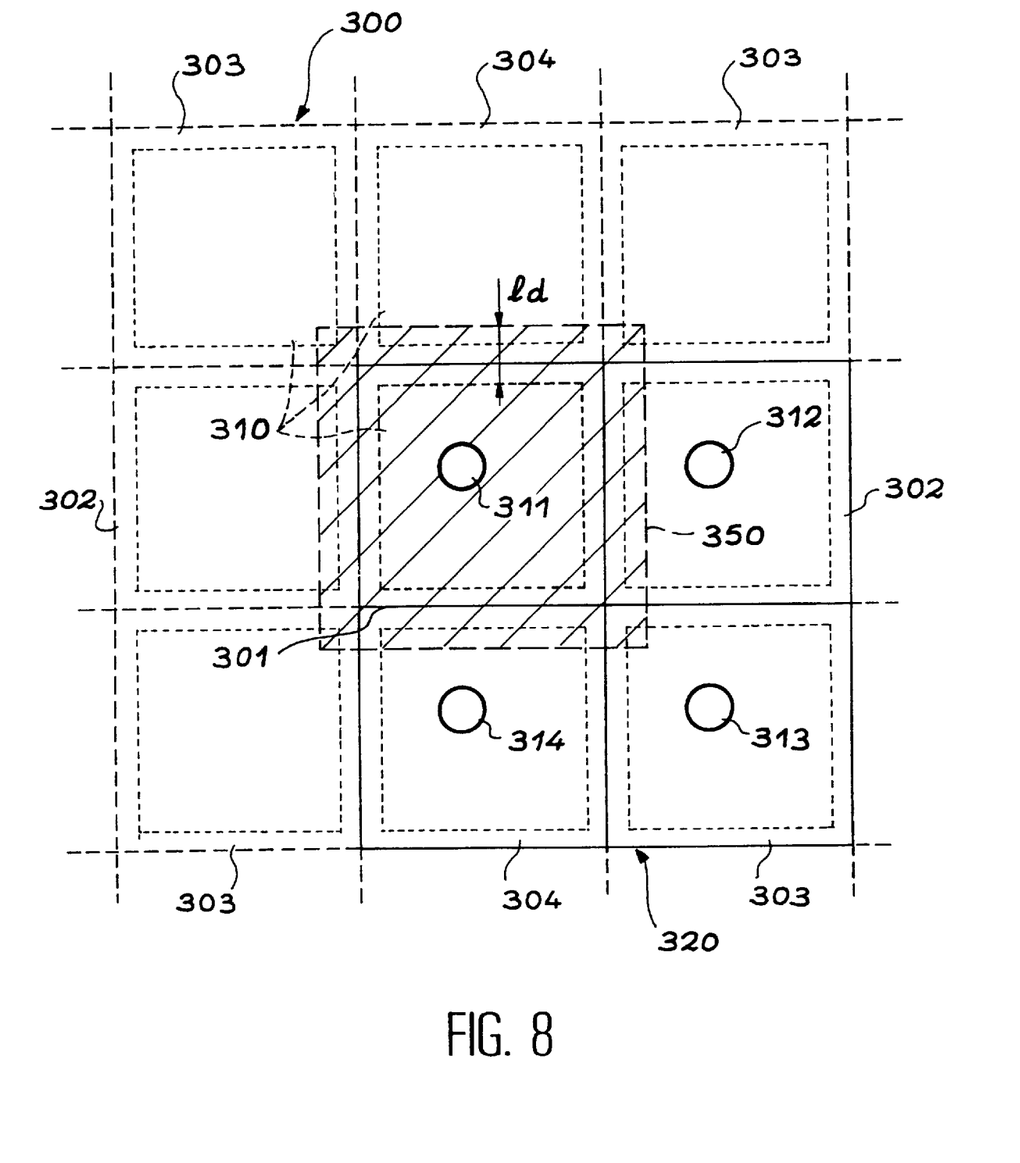
FIG. 8 is a part, diagrammatic, plan view of the detection surface of a mosaic of detectors associated with the reading device of FIG. 7.

The operation of the reading device of FIG. 7 is made more clear by referring to FIG. 8, which diagrammatically and partially shows the detection surface of the detector mosaic associated with the reading device.

The detector mosaic 300 is e.g. a semiconductor wafer in which are formed juxtaposed detectors, whose theoretical physical limit is represented in the drawing by squares 301, 302, 303, 304. Throughout the remainder of the text, these references also designate the corresponding detector.

The semiconductor wafer is e.g. of the n-type and the regions 310 of the p-type, whose limit is shown in broken line form installed in the substrate in order to create junctions forming detectors.

On the mosaic 300 are defined a plurality of subarrays of indentical detectors, whereof only a single one, designated by the reference 320 and shown in continuous line form is completely visible.

The detector subarray 320 is square and comprises four juxtaposed detectors with a substantially square surface. Each of the detectors 301, 302, 303, 304 has a connection element 311, 312, 313 and 314, individually connected to the p-regions of the detectors. A contact common to all the detectors and which is not shown is formed on the n-type substrate. For simplification reasons, the connection elements of the detectors, other than those of the detector subarray 320, are not shown in the drawing.

The connection elements 311, 312, 313, 314 of the detectors 301, 302, 303, 304 are respectively connected to the connection elements 211, 212, 213, 214 of the reading device of FIG. 7.

As the switch 231 of FIG. 7 is closed and the switches 232, 233 and 234 are open, only the detector 301 of the detector subarray 320 is biased and connected to the integrating capacitor 222 associated with the detector subarray.

Thus, as shown in FIG. 8, only the detector 301 of the detector subarray 320 has a active detection surface when the detector is a diode. This active surface 350 corresponds to the space charge area of the detection diode, which is essentially dependent on the bias voltage applied to the detector and to an area defined by the diffusion length 1d, which is essentially dependent on the doping of the semiconductors forming the diode.

In the case where the detector is a diode or a photoconductor, by adjusting the bias voltage applied to the detector, i.e. by modifying the bias voltage $V_{pol}$ of the biasing means 225, it is possible to increase or decrease the active surface of the detector, i.e. vary the extension of the detection area. However, the size of said surface is essentially dependent on the size of the implanted p-regions 310.

As shown in FIG. 8, the active surface has larger dimensions than those of the detectors and "overhangs" neighbouring detectors, which permits an oversampling of the image formed.

However, as the closest neighbouring detectors to the detector 301, i.e. detectors 302 and 304 are neither biased, nor connected to the reading circuit, the diaphoty phenomenon is avoided.

In a particular variant of the mosaic and the reading device, integration and reading take place in accordance with the sequence given by table I.

TABLE I

| Sequence order | Operator | Switches | | | |
|---|---|---|---|---|---|
| | | 231 | 232 | 233 | 234 |
| 1 | Integration detector 301 | F | 0 | 0 | 0 |
| | Reading detector 301 | 0 | 0 | 0 | 0 |
| 2 | Integration detector 302 | 0 | F | 0 | 0 |
| | Reading detector 302 | 0 | 0 | 0 | 0 |
| 3 | Integration detector 303 | 0 | 0 | F | 0 |
| | Reading detector 303 | 0 | 0 | 0 | 0 |
| 4 | Integration detector 304 | 0 | 0 | 0 | F |
| | Reading detector 304 | 0 | 0 | 0 | 0 |

In TABLE I, letters 0 and F respectively designate a closed switch and an open switch.

In this particular embodiment the detectors of the detector subarray are connected in accordance with the same sequence to the integrating capacitor of the subgroup of regions of the reading device associated with the detector subarray of which it forms part.

Thus, on the mosaic 300, a certain number of detectors, all forming part of the different detector subarrays, are active at sequence order 1, others at order 2, etc.

For example, in FIG. 8, all the detectors 302 are simultaneously active, all the detectors 303 are simultaneously active, then the detectors 301 and 304, in turn.

When the sequence order is established in this way, a given detector of a given detector subarray is surrounded by closest neighbouring detectors of the same detector subarray or another detector subarray, but which have a different activation order in the sequence.

For example, detector 301 activated at order 1 (uneven) of the sequence is surrounded by two detectors 304 and two detectors 302, forming the closest neighbours, respectively activated at orders 2 (even) and 4 of the sequence of table I.

Figure 9:
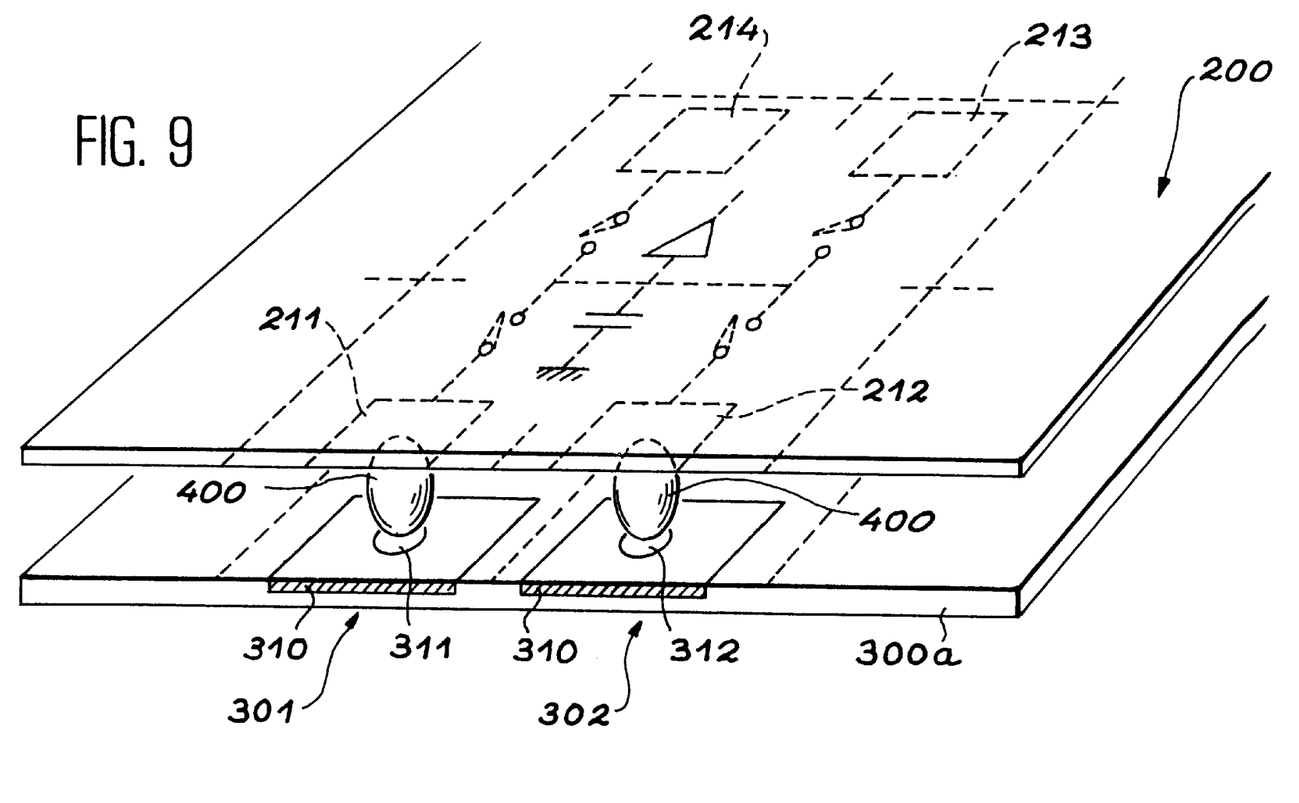
FIG. 9 is a simplified, diagrammatic view illustrating a detection system according to the invention.

FIG. 9 is a very diagrammatic representation of a hybrid structure radiation detector system. Elements of FIG. 9 identical or similar to those of FIGS. 7 or 8 carry the same references so that reference can be made to the aforementioned explanations.

The system of FIG. 9 comprises a first substrate 300a of a semiconductor material with a first conductivity type, e.g. of the n-type, in which are formed a plurality of detectors 301, 302 by the implantation of regions 310 of a second conductivity type, e.g. the p-type.

A second substrate 200 has a reading device according to FIG. 7. For simplification reasons, a single reading circuit connected to connection elements 211, 212, 213, 214 is shown. This reading circuit corresponds to a detector subarray of which form part the detectors 301 and 302 visible in the drawing.

Connection elements 311, 312 of the detectors 301, 302 of the first substrate 300a are connected to the connection elements 211 and 212 of the second substrate by fusible material beads 400.

Other, not shown, fusible material beads in the same way connect each detector of the substrate 300a, respectively to a reading circuit associated with the detector subarray of which it forms part.

Documents Cited in the Present Application (1) "Sampling effects in CdHgTe focal plane arrays" by D. J. Bradley et al., SPIE, vol. 590, Infrared Technology and Applications, (1985), pp 53–60.

(2) "Sampling effects in CdHgTe focal plane arrays practical results" by R. J. Dam et al., SPIE, vol. 685, Infrared Technology, XII (1986), pp 123–128.

We claim:

1. Reading device for a radiation detector array (301, 302, 303, 304) arranged as a detector mosaic (300) and having a plurality of capacitors (222), known as integrating capacitors, each connected to a reading circuit (224, 225), characterized in that each integrating capacitor (222) is respectively associated with a subarray (320) of several detectors of the mosaic, the reading device also comprising a plurality of controllable switches (231, 232, 233, 234) for successively connecting each detector (301, 302, 303, 304) of each detector subarray (320) respectively to the integrating capacitor (222) associated with said detector subarray in order to collect a detection signal of said detector, the reading device comprising means (226) for controlling the closing and opening of switches associated with each detector subarray in accordance with a sequential order excluding the simultaneous integration and simultaneous reading of the detection signal of closest neighbouring detectors of the detector mosaic.

2. Device according to claim 1, characterized in that each detector subarray (320) has an identical number of detectors.

3. Device according to claim 2, characterized in that each detector subarray (320) has a number of detectors between 3 and 9.

4. Device according to claim 1, characterized in that the detectors (301, 302, 303, 304) of each detector subarray (320) are grouped on the detector mosaic.

5. Device according to claim 4, characterized in that each detector subarray (320) has four detectors with a square active surface arranged adjacently to form a detector square.

6. Device according to claim 1, characterized in that each reading circuit respectively connected to an integrating capacitor (222) has biasing means (225) for successively biasing each detector of a detector subarray connected to the integrating capacitor by closing a corresponding controllable switch.

7. Device according to claim 1, characterized in that the detectors (301, 302, 303, 304) are quantum detectors and that the biasing means (225) are able to apply to the detectors (301, 302, 303, 304) an adjustable bias voltage in order to vary the extension of a detection area of each detector.

8. Radiation detection system, characterized in that it incorporates a detector array and a reading device according to claim 1.

9. Detection system according to claim 8, characterized in that it incorporates a first substrate (300a) on which are placed the detectors of the detector array and a second substrate (200) having the reading device, the first and second substrates being connected to form a hybrid system by fusible material beads (400).

10. Detection system according to claim 8, characterized in that the reading device and the detector mosaic (300) form a monolithic assembly.

* * * * *